(12) United States Patent
Yuge et al.

(10) Patent No.: US 6,219,801 B1
(45) Date of Patent: Apr. 17, 2001

(54) WORK INHERITING SYSTEM

(75) Inventors: Toshimichi Yuge; Toshihiro Amemiya; Satoshi Matsumoto; Yasuhiro Suzuki, all of Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/011,737

(22) PCT Filed: Jun. 19, 1997

(86) PCT No.: PCT/JP97/02109

§ 371 Date: Jul. 2, 1998

§ 102(e) Date: Jul. 2, 1998

(87) PCT Pub. No.: WO97/49034

PCT Pub. Date: Dec. 24, 1997

(30) Foreign Application Priority Data

Jun. 20, 1997 (JP) .................................................. 8-159787

(51) Int. Cl.[7] .................................................. G06F 13/00
(52) U.S. Cl. .............................................................. 714/13
(58) Field of Search ........................ 714/11, 13; 709/200

(56) References Cited

U.S. PATENT DOCUMENTS

| 5,526,492 | 6/1996 | Ishida . | |
|---|---|---|---|
| 5,774,642 | * 6/1998 | Flon et al. | 395/182.11 |
| 5,796,937 | * 8/1998 | Kizuka | 395/182.11 |
| 5,802,265 | * 9/1998 | Bressoud et al. | 395/182.09 |

FOREIGN PATENT DOCUMENTS

| 55-66049 | 5/1980 | (JP) . |
| 07044413 | 2/1995 | (JP) . |
| 7-44413 | 2/1995 | (JP) . |
| 07334468 | 12/1995 | (JP) . |
| 7-334468 | 12/1995 | (JP) . |
| 97/49034 | 12/1997 | (WO) . |

* cited by examiner

Primary Examiner—David A. Wiley
(74) Attorney, Agent, or Firm—Staas & Halsey LLP

(57) ABSTRACT

When a fault occurs, a hot-standby cluster takes over the job of the cluster which is at fault, and the load distribution for each job of load-sharing clusters is changed, simplifying the processing for dealing with the fault. Thus the clusters are efficiently used and arranged freely. The system is provided with a plurality of clusters which are operated by one or more of an in-use hot-standby system, a hot-standby waiting system, and a load sharing system for each job according to a table, and of the cluster is provided with a means which instructs a hot-standby waiting cluster to take over the job of a faulty cluster when the job is of the in-use hot-standby system, or instructs another load-sharing cluster to take over the job in a case the job is of the load-sharing system, referring to the table for dealing with a fault at any one of the clusters.

7 Claims, 6 Drawing Sheets

FIG. 4A

| CLUSTER 1 | | | | |
|---|---|---|---|---|
| 0 1 | WORK A | HOT STANDBY | CURRENT | GLOBAL PROCESSING TABLE(FOR INHERITING) |
| 0 2 | WORK B | LOAD SHARING | CURRENT | GLOBAL PROCESSING TABLE(FOR INHERITING) |
| ⋮ 3 2 | | | | |

FIG. 4B

| CLUSTER 2 | | | | |
|---|---|---|---|---|
| 0 1 | WORK A | HOT STANDBY | STANDBY | GLOBAL PROCESSING TABLE(FOR INHERITING) |
| 0 2 | WORK B | LOAD SHARING | CURRENT | GLOBAL PROCESSING TABLE(FOR INHERITING) |
| ⋮ 3 2 | | | | |

FIG. 4C

| CLUSTER 3 | | | | |
|---|---|---|---|---|
| 0 1 | WORK A | HOT STANDBY | STANDBY | GLOBAL PROCESSING TABLE(FOR INHERITING) |
| 0 2 | WORK B | LOAD SHARING | CURRENT | GLOBAL PROCESSING TABLE(FOR INHERITING) |
| ⋮ 3 2 | | | | |

FIG. 5A

GLOBAL PROCESSING TABLE (HOT STANDBY)    22

| | CONTENTS | DETAIL |
|---|---|---|
| 01 | ACQUIREMENT OF RESOURCES | DATABASE |
| 02 | | NETWORK RESOURCES |
| 03 | | VARIOUS KINDS OF TABLES |
| 04 | | HARDWARE RESOURCES |
| 05 | PROCESS | TRANSACTION RECOVERY |
| 06 | | START INFORMATION |
| 07 | | CHANGE OF RATE (MULTIPLEX NUMBER OF TASK) (LOAD SHARING) |
| 08 | | MESSAGE SHARING RATE (LOAD) (LOAD SHARING) |
| ... | | |
| 32 | | |

FIG. 5B

GLOBAL PROCESSING TABLE (LOAD SHARING)    22

| | | CLUSTER 1 | | CLUSTER 2 | | CLUSTER 3 | |
|---|---|---|---|---|---|---|---|
| | | BE ABLE TO PROCESS | HAVE NOT YET BEEN PROCESSED | BE ABLE TO PROCESS | HAVE NOT YET BEEN PROCESSED | BE ABLE TO PROCESS | HAVE NOT YET BEEN PROCESSED |
| 01 | CHANGE OF MESSAGE SHARING RATE | | | | | | |
| 32 | | | | | | | |

FIG. 6

SHARING TABLE 23

| | CLUSTER 1 | CLUSTER 2 | CLUSTER 3 |
|---|---|---|---|
| WORK B | 3 | 3 | 4 |
| | — | 5 | 5 |
| | ... | ... | ... |

WORK INHERITING SYSTEM

FIELD OF THE INVENTION

The present invention relates to a system by which work processes are efficiently carried out by a plurality of processing units in a hot standby mode or a load sharing mode.

BACKGROUND OF THE INVENTION

In a system for which reliability is required, the system is duplicated. That is, two processing units are prepared, and a first processing unit is used as a current system and a second processing unit is on standby for a trouble occurring in the first processing unit. The second processing unit is provided with programs and data needed for processes to promptly inherit works when a trouble occurs in the first processing unit. Such a mode is called a hot standby mode.

In addition, as to a transaction process, although one of the transactions can be carried out in a short time, a large number of transactions which simultaneously occur can not be processed by a single processing unit in realtime. Thus, there is a load sharing mode in which, for distribution of load, the transactions which have occurred are distributed among a plurality of processing units and processed. In this load sharing mode, in a case where a trouble occurs in a processing unit, transactions are not distributed to the processing unit having the trouble.

To form a system in the hot standby mode or the load sharing mode, a large number of programs are needed.

In addition, in recent years, due to decreasing of the price of the processing unit and the necessity of processing many works, operations in a range between an operation in which two or three large general-purpose computers are used and an operation in which many processing units are used are desired. For example, the number of cases where a plurality of processing units each of which is mounted in a frame and named a cluster are connected to each other is increasing (a plurality of CPUs may be included in a single cluster). With the spread of such a case where a plurality of clusters are connected to each other, it is desired that works are efficiently inherited when a trouble occurs in one of the clusters.

SUMMARY OF THE INVENTION

Accordingly, a general object of the present invention is to provide a novel and useful work inheriting system which solves the above problems.

A specific object of the present invention is to provide a work inheriting system, without a great number of programs, in which works can be inherited among a plurality of processing units processing works in the hot standby mode or the load sharing mode when a trouble has occurred.

To achieve the above objects of the present invention, the present invention is a work inheriting system applied to a system in which processes for works are carried out by a plurality of processing units in a hot standby mode, said work inheriting system comprising: storage means for storing a table indicating that each of said processing units for a work is a current system or a standby system; means for, when a trouble occurs in a processing unit which is the current system for a work, causing a processing unit which is the standby system for the work to inherit processes for the work in said processing unit having the trouble with reference to said table stored in said storage means.

According to such a system, in the system in which a work is carried out by a plurality of processing units in the hot standby mode, a processing unit which is the standby system inherits the work processes in the processing unit of the current system in which the trouble occurs, with reference to the table indicating that each of the processing units for a work is the current system or the standby system. Thus, an algorithm for identifying a processing unit which should inherit the work processes is simplified. The work can be efficiently inherited without need of a program having a large size.

In addition, to solve the above problem, the present invention is a work inheriting system applied to a system in which processes for works are carried out by a plurality of processing units in a load sharing mode, said work inheriting system comprising: storage means for storing a table indicating a rate at which each of said plurality of processing units shares processes of the works; means for, when a trouble occurs in a processing unit, causing another processing unit to inherit the work which is shared at a rate by said processing unit having the trouble with reference to said table stored in said storage means.

According to such a system, in the system in which the work is carried out by a plurality of processing units in the load sharing mode, another processing unit inherits the work which is shared at a rate by the processing unit having the trouble with reference to the table indicating a rate at which each of the processing units shares processes of the work. Thus, the inheriting processes are simplified. The work can be efficiently inherited without need of a program having a large size.

Further, to solve the above problem, the present invention is a work inheriting system applied to a system in which processes for a plurality of works are carried out by a plurality of processing units in a hot standby mode and a load sharing mode, said work inheriting system comprising: storage means for storing a table indicating whether works to be processed in the hot standby mode and works to be processed in the load sharing mode are assigned to said respective processing units and whether each of processing units to which the works to be processed in the hot standby mode are assigned is a current system or a standby system; and means for, when a trouble occurs in one of said plurality of processing units, causing a processing unit which is the standby system for a work to be processed in the hot standby mode to inherit processes for the work out of the works assigned to said processing unit having the trouble and another process unit to which a work to be processed in the load sharing process is assigned to inherit processes of the work, with reference to the table stored in said storage means.

According to such a system, in the system in which a plurality of works are carried out by a plurality of processing units in the hot standby mode and the load sharing mode, another processing unit inherits the work processes of the processing unit in which the trouble occurs with reference to the table indicating whether works to be processed in the hot standby mode and works to be processed in the load sharing mode are assigned to said respective processing units and whether each of processing units to which the works to be processed in the hot standby mode are assigned is a current system or a standby system. Thus, the inheriting processes are simplified. The work can be efficiently inherited without need of a program having a large size.

BRIEF DESCRIPTION OF THE DRAWINGS

Other objects, features and advantages of the present invention will be apparent from the following description when read in conjunction with accompanying drawings, in which:

FIGS. 4A; FIG. 4B and FIG. 4C are diagrams illustrating examples of operation state management tables used in processes in the system shown in FIG. 2;

FIGS. 5A and FIG. 5b are diagrams illustrating examples of a global processing table used in processes in the system shown in FIG. 2; and FIG. 6 is a diagram illustrating an example of a sharing table used in the system shown in FIG. 2.

BEST CONFIGURATIONS FOR IMPLEMENTING THE INVENTION

A description will now be given, with reference to FIG. 1, of the principle of a system according to an embodiment of the present invention.

Figure 1:
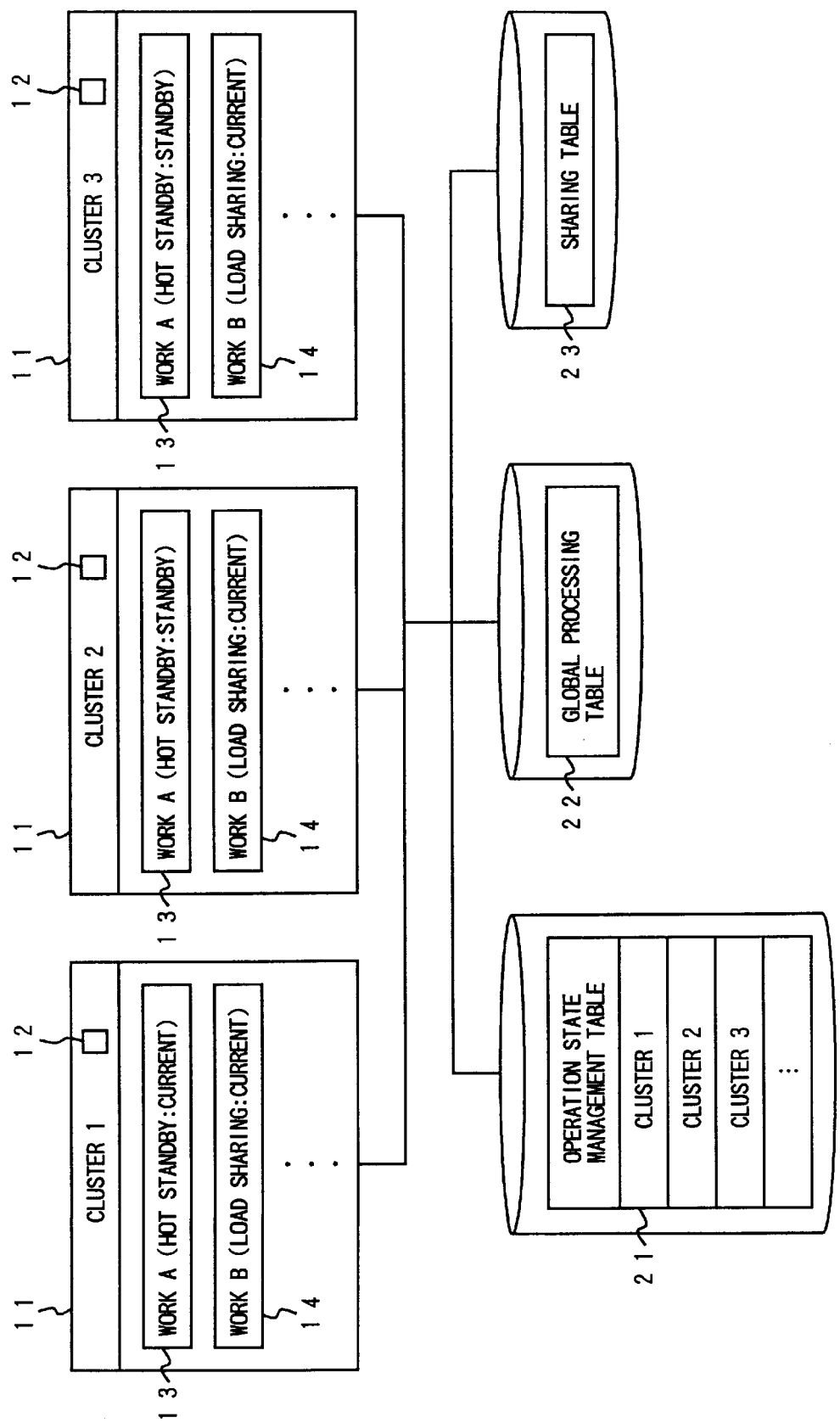
FIG. 1 is a diagram illustrating a system according to the present invention.

Referring to FIG. 1, each of clusters 1, 2 and 3 (hereinafter, to simplify, they are referred to as a cluster), is a processing unit which are mounted in a frame and processes various kinds of works. The cluster has work inheriting means 12 and works 13 and 14.

The work inheriting means 12 inherits works when a trouble occurs in another cluster 11. The works 13 and 14 supply various kinds of works to a plurality of terminals.

An operation state management table 21 manages the operation state of the cluster. A global processing table 22 is used to get resources used for the inheriting of works and for a process of inheriting of works. A sharing table 23 is used to set a load sharing rate of the cluster which should share work units in the load sharing mode.

A description will now be given of operations.

A trouble has occurred in a cluster 11 which processes works as the current system in the hot standby mode. In this case, when the work inheriting means 12 of another cluster 11 determines, with reference to the operation management table 21, that said another cluster 11 is set as a standby system for the work processed by the cluster 11 in which the trouble has occurred, said another cluster 11 inherits the work based on the global processing table 22. When the work inheriting means 12 determines that said another cluster 11 processes works in the load sharing mode together with the cluster in which the trouble has occurred, said another cluster 11 inherits the work based on the global processing table 22.

When a trouble has occurred in one of the clusters 11, only a cluster which starts to inherit works first or a cluster having the highest priority may inherit the works, out of clusters determined with reference to the operation state management table 21 as the standby system for the works processed by the cluster, having the trouble, as the current system in the hot standby mode.

In addition, when a trouble has occurred in one of the clusters 11, only a cluster which starts to inherit works first or a cluster having the highest priority may inherit the works, out of other clusters processing the works determined, with reference to the operation management table 21, to be processed by the cluster having the trouble and the other clusters in the load sharing mode.

In addition, the inheriting process may include a process for changing the cluster 11 operating in the load sharing mode or the multiplex number of a working task in the cluster 11.

In addition, in the inheriting process, a load sharing rate of each of the clusters operating in the load sharing mode is changed based on the sharing table 23.

Thus, in a system in which processes in the hot standby mode and the load sharing mode are mixed, when a trouble occurs, works which were processed by the cluster having the trouble are inherited by a cluster in the hot standby mode on a first come, first served basis. The load sharing rate of each of the clusters processing the works in the load sharing mode is dynamically changed. As a result, when a trouble occurs, the process can be simplified and the clusters 11 can be efficiently operated. A free arrangement of the clusters 11 is possible.

A detailed description will now be given, with reference to FIG. 1 and FIGS. 2 through 6 of, a structure and operations of the system according to an embodiment of the present invention.

Figure 2:
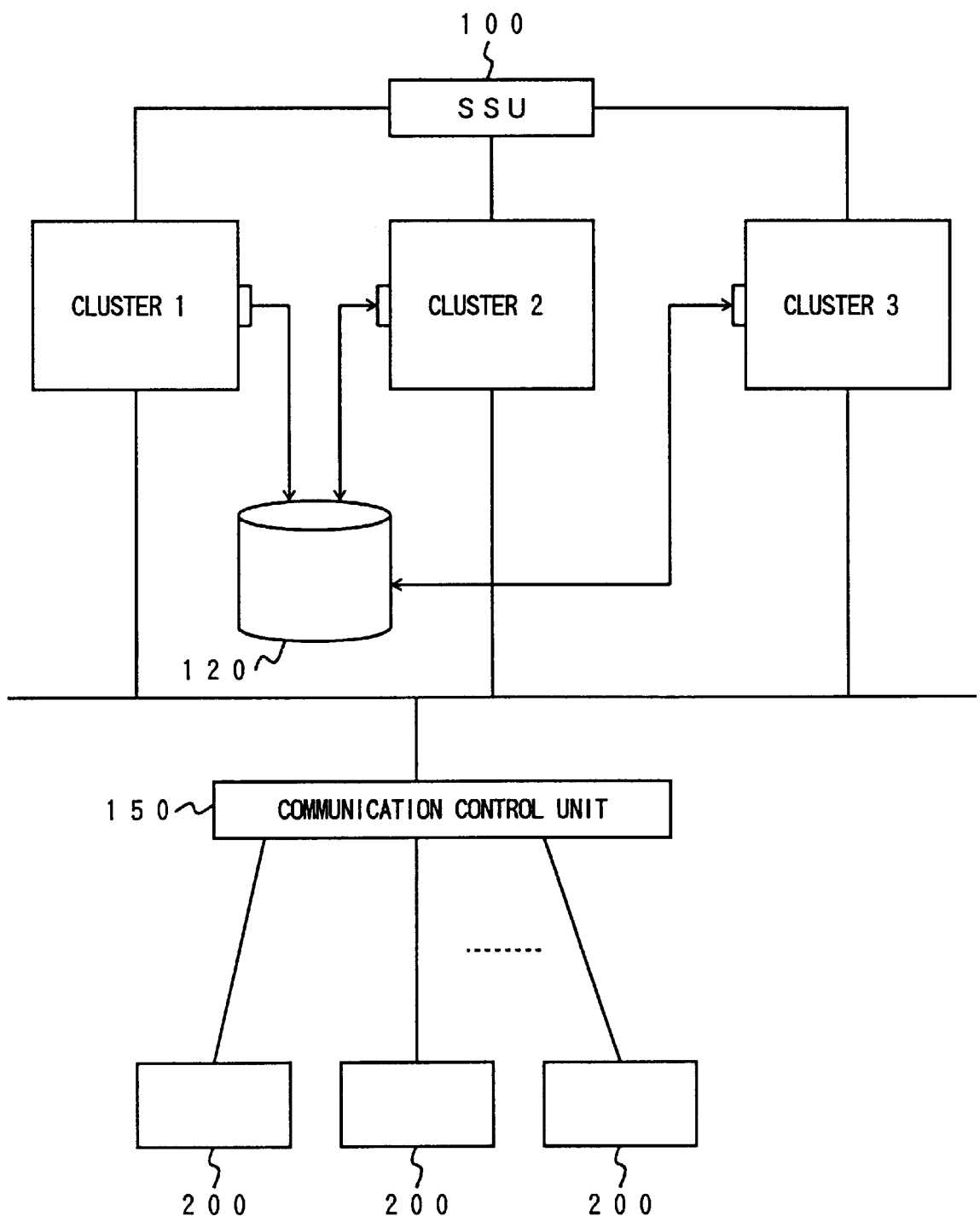
FIG. 2 is a block diagram illustrating hardware of a system according to an embodiment of the present invention.

FIG. 2 shows hardware of the system according to an embodiment of the present invention.

Referring to FIG. 2, a plurality of clusters 1, 2 and 3 (processing units) are connected to a bus. Each of the clusters 1, 2 and 3 has a system storage unit (SSU) 100 and a disc unit 120 which are used as an external storage unit. Each of the clusters 1, 2 and 3 is coupled to a communication control unit 150 via the bus. The communication control unit 150 controls communication regarding various works between the respective clusters 1, 2 and 3 and terminals 200.

The clusters 1, 2 and 3 which correspond to the clusters 1, 2 and 3 shown in FIG. 1 supply services regarding various kinds of works to a plurality of terminals 200 via lines. Each of the clusters 1, 2 and 3 has, as described above, the work inheriting means 12 and various kinds of works 13 and 14 as shown in FIG. 1. The operation state table 21, global processing table 22 and sharing table 23 shown in FIG. 1 are stored in the disk unit 120, so that the respective clusters 1, 2 and 3 can use the respective tables stored in the disk unit 120. In a case where it is necessary for the respective clusters 1, 2 and 3 to carry out table reference operations at high speed, the above tables 21, 22 and 23 are stored in the system memory 100.

Figure 3:
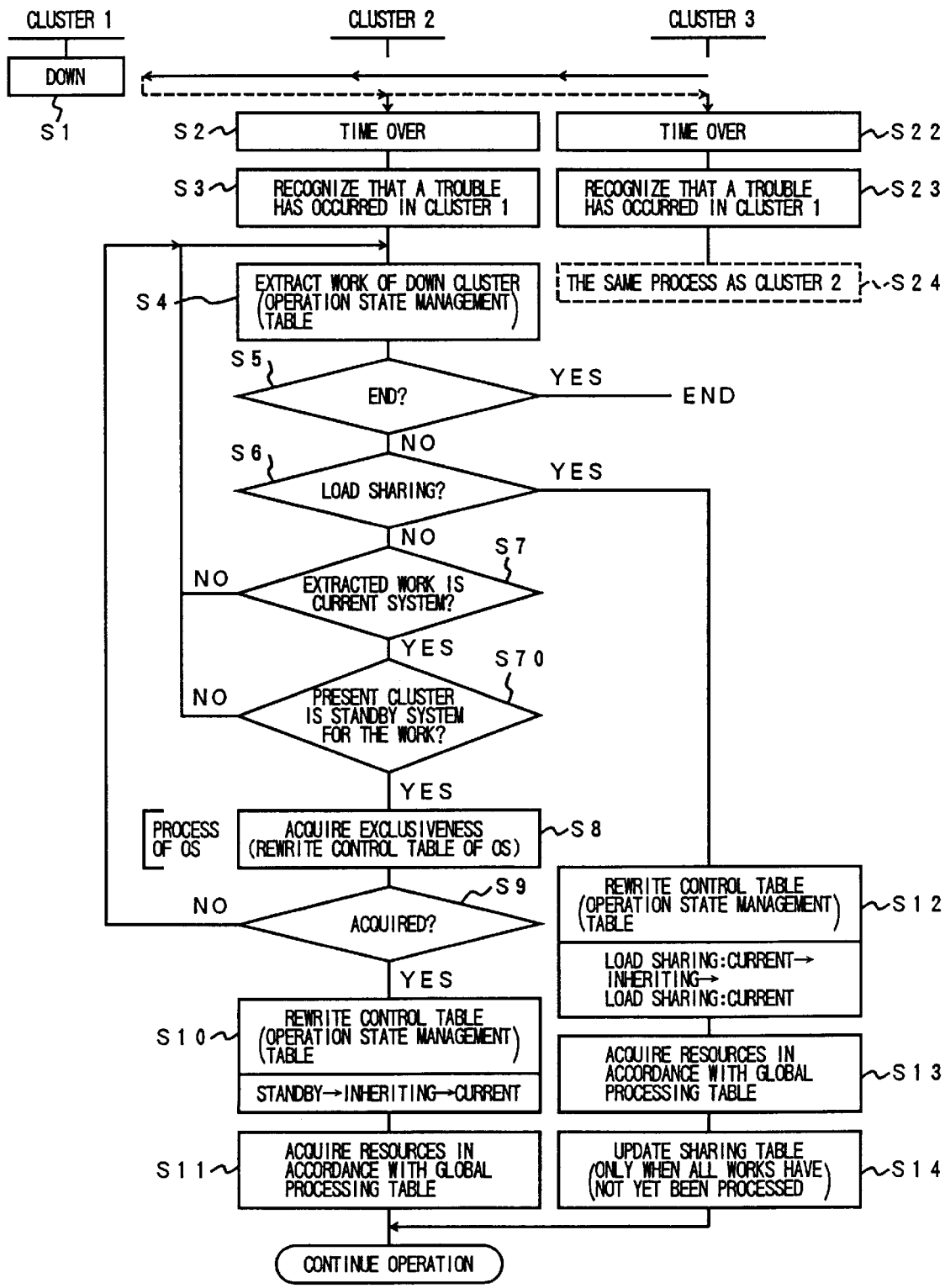
FIG. 3 is a diagram illustrating operations of the system shown in FIG. 2.

The work inheriting means 12 provided in each of the clusters 1, 2 and 3 is a function for inheriting works for another cluster in which a trouble occurs (see FIG. 3). In addition, each of the clusters 1, 2 and 3 is assigned with the works 13 and 14, and services regarding the works 13 and 14 are supplied from the respective clusters 1, 2 and 3 to the plurality of terminals 200. The works 13 and 14 are, for example in a bank, a deposit work in an account system, an exchange work and a financing work and the like. In this embodiment, the work 13 is a work A which should be processed in the hot standby mode. The work 14 is a work B which should be processed in the load sharing mode. The cluster 1 is set as the current system for the work A which should be processed in the hot standby mode. The other clusters 2 and 3 are the standby system for the work A (see FIG. 1). In addition, the work B is processed by the respective clusters 1, 2 and 3 in the load sharing mode (see FIG. 1).

The operation state management table 21 manages states of operations of the respective clusters and relates the current system in the hot standby mode, the standby system in the hot standby mode, the current system in the load sharing mode and the global processing table (for the inheriting) to each other for each work (see FIG. 4A, FIG. 4B and FIG. 4C).

The global processing table 22 is provided with resources used for works and processes to be executed (see FIG. 5A and FIG. 5B).

The sharing table 23 is provided with the load sharing rate of each of the clusters for each work (see FIG. 6).

A detailed description will now be given, in accordance with a procedure shown in FIG. 3, of operations of the above system, using FIGS. 4A through FIG. 6.

FIG. 3 illustrates operations. The clusters 1, 2 and 3 shown in FIG. 3 correspond to the clusters 1, 2 and 3 shown in FIG. 1 and FIG. 2.

The respective clusters 1, 2 and 3 periodically exchange telegraphic messages with each other and monitor whether there are responses to the telegraphic messages. As shown in FIG. 3, for example, when the cluster 1 breaks down (operations are stopped) due to a trouble (S1), the other clusters 2 and 3 carry out the following operations.

When the other clusters 2 and 3 detect, at a predetermined timing, that no response to the telegraphic message is received during a predetermined period of time (time-over) from a time at which the telegraphic message is transmitted (S2 and S22), the other clusters 2 and 3 recognize that a trouble has occurred in the cluster 1 (S3 and S23). Since the clusters 2 and 3 carry out the same process for inheriting the work, hereinafter, a description will be given of the process of the cluster 2.

When the cluster 2 recognizes that a trouble has occurred in the cluster 1 (S3), the work assigned to the cluster 1 which has broken down is extracted with reference to the operation state management table 21 of the cluster 1 as shown in FIG. 4A (S4). It is determined whether the extracted work has been completed (S5). If YES, the process is terminated. If NO (in a case where there is a work which has not yet been completed), the process proceeds to the next step S6.

In a case where the extracted work has not yet been completed (NO in S5), it is further determined, with reference to the operation state management table 21 (see FIG. 4A), whether the work should be processed in the load sharing mode (S6). If YES, since it is determined that the work should be processed in the load sharing mode, the process proceeds to step S12 and the inheriting process for the work to be processed in the load sharing mode. On the other hand, if NO, since it is determined that the work should be processed in the hot standby mode, the process proceeds to step S7.

In the step S7, with reference to the operation sate management table, it is determined whether the cluster 1 has been set as the current system for the work. If the cluster 1 has been set as the standby system (NO, in S7), since it is not necessary to inherit the work, the process returns to step S4. A work assigned to the cluster 1 in which the trouble has occurred is further extracted and the process is carried out in the same procedure as in the above case.

On the other hand, if the cluster in which the trouble has occurred is set as the current system for the work (YES, in S7), the cluster 2 determines, with reference to the operation state management table 21 for cluster 2 as shown in FIG. 4B, whether the present cluster (the cluster 2) is set as the standby system for the work for which the cluster having the trouble is set as the current system (S70). If the cluster 2 is not set as the standby system for the work, since it is not necessary for the cluster 2 to inherit the work, the process returns to step S4. A work assigned to the cluster 1 in which the trouble has occurred is further extracted and the process is carried out in the same procedure as in the above case.

On the other hand, if the cluster 2 is set as the standby system for the work (YES in S70), the process for inheriting the work proceeds in accordance with the procedure from step S8 to step S11.

First, in step S8, an exclusiveness acquiring request is output. In step S9, it is determined, in response to the exclusiveness acquiring request, whether the exclusiveness can be acquired. If YES, the operation state management table is rewritten so that the exclusiveness is acquired. In this case, the cluster (the cluster 2 or 3) which acquires the exclusiveness first and has the lowest load acquires the exclusiveness. Only the cluster having the lowest load inherits the work for the cluster which has broken down. If the exclusiveness is not acquired, it is not necessary to inherit the work, so that the process returns to step S4. A work assigned to the cluster 1 in which the trouble has occurred is extracted and the process carried out in the same procedure as in the above case.

As has been described above, for example, when the cluster 2 acquires the exclusiveness, the control table is rewritten in step S10. The state of the work in the operation state management table 21 of the cluster 2 as shown in FIG. 4B is rewritten, for example, from "standby" "inheriting". When the inheriting process is completed, the state is rewritten to the "current".

Further, in step S11, resources are acquired in accordance with the global processing table shown in FIG. 5A. In accordance with the global processing table (hot standby) 22, the acquirement of the resources (required database resources, network resources, various kinds of tables, hardware resources and the like) and processes (processes regarding the transaction recovery, start information, change of rates and the message sharing rate.

When the inheriting process is completed, the cluster 2 continues actual operations for the work inherited from the cluster 1 (S15).

Due to steps 1 through 11 and step S15, when the cluster 1 breaks down, the cluster 2 which starts the inheriting process, with reference to the operation state management table 21, first (the exclusiveness is acquired) inherits the work (the work A) which was being processed by the cluster 1 in the hot standby mode.

On the other hand, if it is determined that the work should be processed in the load sharing mode (YES in S6), the process proceeds to step S12 and the control table is rewritten. Since it is determined that the cluster 2 should process the same work as the cluster 1 in the load sharing mode, the operation state management table 21 is rewritten so that the work is processed by the remaining clusters (the state of the work that should be processed in the load sharing mode is rewritten, for example, from "current" to "inheriting", and when the inheriting process is completed, the state is further rewritten to "current").

After this, in step S13, the resources are acquired in accordance with the global processing table. That is, after the state of the present work in the operation state management table 21 is rewritten to "current" as described above, the acquirement of the resources (the database resources, the network resources, various kinds of tables and the hardware resources) is carried out, as the inheriting process, in accordance with the global processing table (the load sharing mode) 22 shown in FIG. 5A.

In step S14, the sharing table shown in FIG. 6 is updated and telegraphic messages of the cluster 1 for which the global processing table shown in FIG. 5B indicates that it has not yet been processed is processed. That is, in this case, since the work of the cluster 1 which has been broken down should be processed in the load sharing mode, the cluster 2 reshares the load sharing rate of the cluster 1 with the cluster 3 and decides the load sharing rate for the work of the cluster 2. The load sharing rate of the cluster 2 for the work B, in the sharing table 23, which should be processed in the load sharing mode is updated. As to the cluster 3, the load sharing rate of the cluster 3 for the work B in the sharing table 23 is updated in the same manner as in the case of the cluster 2 (see FIG. 6). In addition, processes of the telegraphic messages which have not yet been processed by the broken down cluster 1 managed in the global processing table 22 shown in FIG. 5B is executed as a recovery process. The telegraphic messages which have been recovered are managed in the global processing table 22 as messages which have been processed.

After this, the clusters 2 and 3 process the work B in the load sharing mode in accordance with the sharing table 23 in which the load sharing rates have been updated (S15).

Due to the process in step S1 through S5 and step S12 through S15 in the case of YES in step S6, when the cluster 1 is broken down and the clusters 2 and 3 determine, with reference to the operation state management table 21, that the work (the work B) processed by the cluster 1 should be processed in the load sharing mode, the sharing table 23 is updated so that the load sharing rate for the work of the broken down cluster 1 is shared by the other clusters 2 and 3. The work is inherited based on the load sharing rate in the updated sharing table 23 and work which has not yet been processed is recovered.

According to the above matters, by only setting information regarding the load sharing mode for each work in the operation state management table 21, the global processing table 22 and the sharing table 23, when one of the clusters is broken down, each work can be automatically inherited in the load sharing mode.

By the process in step S1 through step S15 as described above, even if the works to be processed in the hot standby mode and the load sharing mode are mixed, information regarding the current-system/standby-system for each work in the hot standby mode and information regarding the load sharing mode are set in the operation state management table 21, the global processing table 22 and the sharing table 23, so that the work can be automatically inherited by other clusters when the cluster 11 is broken down.

A detailed description will now be given of the respective tables used in the above process.

FIGS. 4A, FIG. 4B and FIG. 4C show examples of the operation state management tables which are used in the above process for the respective clusters.

FIG. 4A shows an example of the operation state management table for the cluster 1. In the operation state management table 21 for the cluster 1, for example, information corresponding to works is set as follows.

| NO. | WORK | MODE | CURRENT/STANDBY | GLOBAL PROCESSING TABLE |
|---|---|---|---|---|
| 1 | A | HS | current | global processing table (for inheriting) |
| 2 | B | LS | current | global processing table (for inheriting) |

HS: the hot standby mode
LS: the load sharing mode

In the above table, the "NO." is a sequential number, and a value not greater than 32 can be registered as the "NO.". The work is a work which should be processed in the cluster 1, such as a deposit work in an account system, an exchange work and a financing work and the like. The mode and the current/standby are set for each work. In the current/standby, the current system or the standby system is set for the work of the cluster 1 (In a case of the standby system, when a cluster set as the current system is broken down, the standby system is changed to the current system). The global processing table specifies acquirement of resources and processes needed to inherit the work.

FIG. 4B shows an example of the operation state management table for the cluster 2. In the operation state management table for the cluster 2, for example, information corresponding to works is set as follows.

| NO. | WORK | MODE | CURRENT/STANDBY | GLOBAL PROCESSING TABLE |
|---|---|---|---|---|
| 1 | A | HS | standby | global processing table (for inheriting) |
| 2 | B | LS | current | global processing table (for inheriting) |

HS: the hot standby mode
LS: the load sharing mode

FIG. 4C shows an example of the operation state management table for the cluster 3. In the operation state management table for the cluster 3, for example, information corresponding to works is set as follows.

| NO. | WORK | MODE | CURRENT/STANDBY | GLOBAL PROCESSING TABLE |
|---|---|---|---|---|
| 1 | A | HS | standby | global processing table (for inheriting) |
| 2 | B | LS | current | global processing table (for inheriting) |

HS: the hot standby mode
LS: the load sharing mode

As shown in FIGS. 4A, FIG. 4B and FIG. 4C, the operation state management tables 21 for the respective clusters 1, 2 and 3 are formed, so that the works of the respective clusters are processed in a state (the current system or the hot standby system in the hot standby mode and the current system in the load sharing mode) which is described as the state of the works A and B in the clusters 1, 2 and 3 shown in FIG. 1 and FIG. 2. When one of the clusters is broken down, the system can be operated so that a cluster as the standby system in the hot standby mode for each work or a cluster as the current system in the load sharing mode automatically inherits the work in accordance with the procedure shown in FIG. 3.

FIG. 5A shows an example of the global processing table (the hot standby mode). This global processing table (the hot standby mode) 22 is used for the acquirement of resources and processes as shown in the figure.

| CONTENTS | DETAIL |
|---|---|
| acquirement of resources | database |
| | network resources |
| | various kinds of tables |
| | hardware resources |
| process | transaction recovery |
| | start information |
| | change of rate (multiplex number of a task) |
| | (the load sharing mode) |
| | message sharing rate |
| | (load: the load sharing mode) |

In the above table, the acquirement of resources regarding the database means that the database is acquired and can be accessed from the work. The acquirement of the network resources means that resources (e.g., addresses) regarding the network are acquired and mutual communication can be carried out. The acquirement of the various kinds of tables means that areas for the various kinds of tables are acquired and the contents to the tables are set. The acquirement of the hardware resources means that resources (e.g., printers, memories and the like) used in the works are acquired. In addition, as to the process, in the transaction recovery, telegraphic messages, indicated in the global processing table (the load sharing mode) shown in FIG. 5B, which have not yet been processed for the broken down cluster is processed and recovered. In the start information, a cluster which inherits the work starts to operate the work and informs on to the effect that the cluster starts the work. In the change of rate (multiplex number of a task)(the load sharing mode), in the load sharing mode in which the work having a plurality of tasks is shared, the rate of shared telegraphic messages is changed (the change of load sharing rate).

As has been described above, due to the acquirement of resources and setting of the processes in the global processing table 22, when a cluster which is the standby system in the hot standby mode inherits the work, the resources needed for the work can be automatically acquired and the processes for inheriting the work can be carried out.

FIG. 5B shows an example of the global processing table (the load sharing mode). The clusters 1, 2 and 3 receive telegraphic messages in the load sharing mode, and processing states are stored in the table. Telegraphic messages which have not yet been processed are processed by the cluster using the transaction recovery by which the work is being inheriting.

FIG. 6 shows an example of the sharing table. When a cluster is broken down in a state where clusters process the work in the load sharing mode, the sharing table is used to change the rate at which another cluster shares the load. For example, in a case where the work B is shared by the clusters in the load sharing mode as follows,

| WORK | CLUSTER 1 | CLUSTER 2 | CLUSTER 3 |
|---|---|---|---|
| B | 3 | 3 | 4 | when the cluster 1 is broken down, the load sharing rate is automatically changed as follows.

| WORK | CLUSTER 1 | CLUSTER 2 | CLUSTER 3 |
|---|---|---|---|
| B | — | 5 | 5 |

As has been described above, according to the present invention, in the system in which the hot standby mode and the load sharing mode are mixed, when a trouble has occurred, the work of the cluster having the trouble is inherited by a first served cluster in the hot standby mode, and the load sharing rate for each work of the clusters is dynamically changed. Thus, the processes to be carried out when a trouble has occurred can be easily designed and the clusters can be efficiently operated. Further, free arrangement of the clusters is possible.

The present invention is not limited to the aforementioned embodiments, and other variations and modifications may be made without departing from the scope of the claimed invention.

What is claimed is:

1. A work inheriting system applied to a system in which processes for a plurality of works are carried out by a plurality of processing units in a hot standby mode and a load sharing mode, said work inheriting system comprising:

storage means for storing a table indicating whether work to be processed in the hot standby mode and work to be processed in the load sharing mode are assigned to the respective processing units and whether each of the processing units to which the work to be processed in the hot standby mode is assigned is a current system or a standby system; and means for, when a problem occurs in one of the plurality of processing units, causing a processing unit which is the standby system for work to be processed in the hot standby mode to inherit processes for the hot standby work assigned to the processing unit having the problem, and causing another processing unit that is assigned work to be processed in the load sharing mode to inherit processes of the load sharing work, with reference to the table stored in the storage means.

2. The work inheriting system of claim 1, wherein each of the processing units comprises:

problem occurrence detecting means for detecting that a problem has occurred in another processing unit;

determination means for determining, with reference to the table stored in the storage means, whether the processing unit is the standby system for the work of the processing unit having the problem; and inheriting means for the standby processing unit to inherit the work of the processing unit having the problem.

3. The work inheriting system of claim 1, wherein each of the processing units comprises:

problem occurrence detecting means for detecting that a problem has occurred in another processing unit;

determination means for determining, with reference to the table stored in the storage means, whether the processing unit should process the work of the processing unit having the problem in the load sharing mode; and inheriting means for inheriting the processes for the work of the processing unit having the problem when it is determined that the processing unit should process the work in the load sharing mode.

4. The work inheriting system of claim 2, wherein a processing unit which starts the inheriting process first, or a processing unit which has the highest priority, inherits the processes for the work of the processing unit having the problem.

5. The work inheriting system of claim 1, further comprising a changing process for changing a load sharing rate in each of the processing units which processes the work in the load sharing mode.

6. A recording medium storing a program for a work inheriting system in which processes for a plurality of works are carried out by a plurality of processing units in a hot standby mode and a load sharing mode, comprising means for, when a problem occurs in one of the plurality of processing units, causing a processing unit which is the standby system for work to be processed in the hot standby mode to inherit processes for the hot standby work assigned to the processing unit having the problem, and causing another processing unit that is assigned work to be processed in the load sharing mode to inherit processes of the load sharing work, with reference to a table indicating whether work to be processed in the hot standby mode and work to be processed in the load sharing mode are assigned to the respective processing units and whether each of the processing units to which the work to be processed in the hot standby mode is assigned is a current system or a standby system.

7. A method of providing work inheritance for a system in which processes for a plurality of work tasks are carried out by a plurality of processing units in a hot standby mode and a load sharing mode, comprising:

storing a table indicating whether the work tasks are assigned to the processing units and whether each of the processing units is a current system or a standby system; and referring to the table and causing, when a problem occurs in one of the processing units, a processing unit that is the standby system for work to be processed in the hot standby mode to inherit processes for the hot standby work assigned to the processing unit having the problem, and causing another processing unit that is assigned work to be processed in the load sharing mode to inherit processes of the load sharing work.

* * * * *